(12) United States Patent  
Rice et al.

(10) Patent No.: US 8,732,294 B1  
(45) Date of Patent: May 20, 2014

(54) METHOD AND SYSTEM FOR MANAGING CONFIGURATION MANAGEMENT ENVIRONMENT

(75) Inventors: Tony Ray Rice, Cary, NC (US); Jeffrey Albert Mastrangelo, Durham, NC (US); Paul S. Kennedy, Portland, OR (US)

(73) Assignee: Cisco Technology, Inc., San Jose, CA (US)

( * ) Notice: Subject to any disclaimer, the term of this patent is extended or adjusted under 35 U.S.C. 154(b) by 778 days.

(21) Appl. No.: 11/439,363

(22) Filed: May 22, 2006

(51) Int. Cl.
    *G06F 15/173* (2006.01)
    *H04L 12/26* (2006.01)
    *H04L 12/24* (2006.01)

(52) U.S. Cl.
    CPC ........... *H04L 43/045* (2013.01); *H04L 41/0853* (2013.01)
    USPC .......................................... 709/224; 709/223

(58) Field of Classification Search
    CPC ..................... H04L 41/0853; H04L 43/045
    USPC ................................. 709/223, 224
    See application file for complete search history.

(56) References Cited

U.S. PATENT DOCUMENTS

| | | | |
|---|---|---|---|
| 6,370,573 B1 * | 4/2002 | Bowman-Amuah | 709/223 |
| 6,571,245 B2 * | 5/2003 | Huang et al. | 1/1 |
| 7,246,163 B2 * | 7/2007 | Tindal | 709/223 |
| 7,278,106 B1 * | 10/2007 | Mason | 715/744 |
| 7,379,991 B2 * | 5/2008 | Muto | 709/223 |
| 2002/0124245 A1 * | 9/2002 | Maddux et al. | 717/176 |
| 2002/0169745 A1 * | 11/2002 | Hotti et al. | 707/1 |
| 2004/0267691 A1 * | 12/2004 | Vasudeva | 707/1 |
| 2006/0047809 A1 * | 3/2006 | Slattery et al. | 709/224 |
| 2006/0129892 A1 * | 6/2006 | Diaconu et al. | 714/38 |

OTHER PUBLICATIONS

Radding, Alan; Scalable software configuration management: Avoiding the trauma and expense of changing SCM solutions; Jul. 23, 2006 ; IBM developers works, Rational White Paper.

* cited by examiner

*Primary Examiner* — Hee Soo Kim

(74) *Attorney, Agent, or Firm* — Fish & Richardson P.C.

(57) ABSTRACT

A method and a system for managing a configuration management environment in a large organization are provided. A Configuration Management (CM) system is installed in infrastructure devices used by users in the configuration management environment. These users are distributed in a geographically wide area. Information is collected relating to development processes executed in the configuration management environment. This information further includes information regarding performance, management and configuration of the infrastructure devices. The collected information is collated, organized and links corresponding to various information are also provided. Further, the collected information is provided through an access point to the users, to manage the configuration management environment.

18 Claims, 21 Drawing Sheets

FIG. 9 host1 configuration this is a test version

| Servers | Host Configuration | VOBs | Views | Dependencies | Host Metrics | Logs | Upcoming Downtime | MultiSite Rules | Reports |
|---|---|---|---|---|---|---|---|---|---|
| Hostname (hostid) | host1 (3340870f) | | | | | | | | |
| Host Type (class) | view_server (production) | | | | | | | | |
| theater | Americas(East) | | | | | | | | |
| Location | 1872 North Main Street, Blacksburg, Virginia, United States | | | | | | | | |
| Building (Location) | RTP7V (M) | | | | | | | | |
| user contact | scm-team | | | | | | | | |
| host contact | ecs-se-unix ✉ ami-unix-duty | | | | | | | | |
| trouble ticket assignment group | Admin-Unix | | | | | | | | |
| System | Sun Fire V240 | | | | | | | | |
| OS | solaris 5.8 solaris Generic_117350-12 | | | | | | | | |
| # CPUs | 2 | | | | | | | | |
| ClearCase Admin | scm-team | | | | | | | | |
| owner contact | | | | | | | | | |
| ClearCase Version | 2003.06.00-24 | | | | | | | | |
| Multisite Version | 2003.06.00-9 | | | | | | | | |
| registry server | vt-scm-rgy | | | | | | | | |
| license host | vt-scm-rgy | | | | | | | | |
| view servers | host1, host38, host40, host10 | | | | | | | | |
| vob servers | host12, host99, host56, host78 | | | | | | | | |
| monitored | yes | | | | | | | | |
| upcoming downtime | | | | | | | | | |

FIG. 14

Host Portal

| Servers | Host Configuration | VOBs | Views | Dependencies | Host Metrics | Logs | Upcoming Downtime | MultiSite Rules | Reports |

All dates and times are in PDT

4 this week (20060515-20060521)

| Start | Stop | Title | Implementor | hostname | location | change id |
|---|---|---|---|---|---|---|
| 2006/05/18 08:00 | 2006/05/18 18:00 | EMEA-GSD-FI: Monza Prefix List Adjustement | pbreske | milan-view1 | mil | 381947 |
| 2006/05/18 10:30 | 2006/05/22 12:00 | disk replacement | ccorea | cammie | sjc | 382464 |
| 2006/05/18 12:00 | 2006/05/18 16:00 | buildhost memory dimm replacement | kemerson | buildhost | bxb | 382291 |
| 2006/05/22 17:00 | 2006/05/22 20:00 | Replace failed disk in sjc-squires-vob | rwakeman | sjc-mcbryde-rgy | sjc | 382389 |

3 next week (20060522-20060528)

| Start | Stop | Title | Implementor | hostname | location | change id |
|---|---|---|---|---|---|---|
| 2006/05/22 09:00 | 2006/05/22 12:00 | Replace failed disk in sjc-squires-vob | rwakeman | sjc-squires-vob | sjc | 382389 |
| 2006/05/23 05:00 | 2006/05/23 09:00 | EHS: host1 migration to sjc-host1-vob | gduke | host1 | sjc | 382474 |
| 2006/05/23 08:00 | 2006/05/23 19:00 | Attach disk arrays to hrn-vob1 and hrn-vob2 | rdavies | congress | hrn | 382452 |

2 the rest (20060529 and on)

| Start | Stop | Title | Implementor | hostname | location | change id |
|---|---|---|---|---|---|---|
| 2006/06/02 16:00 | 2006/06/03 05:00 | Reading gpk PD for EPO Installation | rbittan | myhost | gpk | 382435 |
| 2006/06/07 16:30 | 2006/06/07 20:30 | INS-NW-EMEA : Apply EIGRP to c&w Amsterdam and London CE-PE wan links | gdownes | yourhost | nm | 381813 |

Last Updated: 05/18/06 11:26:22 PDT

FIG. 16

FIG. 17 this is a text version

| Servers | Host Configuration | VOBs | Views | Dependencies | Host Metrics | Logs | Upcoming Downtime | MultiSite Rules | Reports |

Virtual Workspace Inventory

| tag | owner | storage size (Mb) | last used | age (days) | storage fs | errors |
|---|---|---|---|---|---|---|
| test1-uptime.scratch | test1 | 0.1 Mb | 2006/05/11 02:43 | 1.0 | /vws/acp | |
| userida-examine | userida | 0.9 Mb | 2006/05/18 01:31 | 15.2 | /vws/acp/userid-examine | |
| userid-Recordb10869 | userid | 1.0 Mb | 2006/05/15 12:00 | 84.0 | /vws/acp/userid-Recordb10869 | |
| userid-handle_ports | userid | 0.9 Mb | 2006/05/17 15:03 | 86.1 | /vws/acp/userid-handle_ports | |
| userid-Recordd07950 | userid | 0.9 Mb | 2006/05/17 19:06 | 49.0 | /vws/acp/userid-Recordd07950 | |
| jamastra-nt3 | jamastra | 0.3 Mb | 2006/04/19 15:02 | 133.2 | /vws/jamastra | |
| jamactra.nt | jamastra | 0.0 Mb | 2006/04/12 16:03 | 76.0 | /vws/acp | |
| userid-Recordd93432 | userid | 1.0 Mb | 2006/05/18 04:34 | 12.2 | /vws/acp/userid-Recordd93432 | |
| trice-v4.2.1 | trice | 0.1 Mb | 2006/05/16 14:44 | 0.0 | /vws/acp | |
| jeff-test | jamastra | 0.0 Mb | | 0.0 | /vws/jamastra | startable.db |
| userid-V3_7_0 | userid | 0.1 Mb | 2006/03/13 02:59 | 62.1 | /vws/acp | |
| jamastra-snap | jamastra | 0.3 Mb | 2006/05/17 15:02 | 72.2 | /vws/jamastra | |
| useridb-thing_pl2_st | useridb | 0.1 Mb | 2006/03/02 15:53 | 26.0 | /vws/acp | |
| jamastra-v4.2.1 | jamastra | 0.1 Mb | 2006/05/18 11:10 | 3.1 | /vws/acp | |
| userid-v4_0_0_alpha_5_release | userid | 0.1 Mb | 2006/05/09 15:40 | 1.0 | /vws/acp | |
| userid-Recordd55594 | userid | 0.9 Mb | 2006/05/18 13:39 | 25.2 | /vws/acp/userid-Recordd55594 | |
| paulk.myhost.html-unknown | paulk | 0.3 Mb | 2006/04/26 15:28 | 51.2 | /vws/paulk | |
| userid-Recordd94189 | userid | 0.9 Mb | 2006/05/18 09:01 | 50.1 | /vws/acp/userid-Recordd94189 | |
| userid-hdie | userid | 0.1 Mb | 2006/03/13 02:57 | 52.0 | /vws/acp | |
| userid-Recordd46448 | userid | 0.9 Mb | 2006/05/17 21:02 | 62.1 | /vws/acp/userid-Recordd46448 | |

FIG. 19

METHOD AND SYSTEM FOR MANAGING CONFIGURATION MANAGEMENT ENVIRONMENT

BACKGROUND OF THE PRESENT INVENTION

1. Field of the Present Invention

Embodiments of the present invention relate, in general, to Software Configuration Management (SCM). More specifically, the embodiments of the present invention relate to a SCM portal for an SCM environment.

2. Description of the Background Art

Many organizations rely on Software Configuration Management (SCM) systems to manage distributed software development teams. According to IEEE-STD-610, SCM is described as a discipline applying technical and administrative direction and surveillance to identify and document the functional and physical characteristics of a configuration item, control changes to those characteristics, record and report change processing and implementation status, and verify compliance with specified requirements. A configuration item is a discrete document, drawing, software element or hardware unit whose development history that is relevant to a project and that must be stored so that any item can be reconstructed in one of its former states.

A typical SCM system can be defined as a set of activities, which are designed to control changes in the software development processes by identifying work products that are likely to change, establish relationships among the work products, define mechanisms for managing different versions of these work products, control the changes imposed, and audit and report on the changes made. Examples of SCM systems include, but are not limited to ClearCase (including Multi-Site, ClearGuide, ClearDDTS and ClearQuest), Concurrent Versions Systems (CVS), Visual SourceSafe, Perforce, AccuRev, BitKeeper, SpectrumSCM, Starbase, Merant PVCS, Telelogic CM Synergy, RCS, SVK, Vesta, Montone, Starbase, Sun Teamware, Seapine, Aegis, SCCS, Git, AlienBrain, Bazaar, SourceGear Vault, StarTeam, Subversion, Surround, VSS, VSS Journal, Roundtable, and AllFusion Endevor.

A typical software development process involves a number of developers who simultaneously perform different tasks on various files related to the software development processes. The files can be documents, source codes, images etc. In such a multiple developer environment, SCM systems are installed for addressing problems related to sharing and simultaneously updating data. Further, SCM systems track metadata of the files related to the software development processes. In addition, SCM systems keep a track of the developers modifying the files.

Conventionally, SCM systems provide tools and other information sources for managing software configuration management environment. The SCM tools track the software development processes. Further, the SCM tools automate the enforcement of the software development policies and procedures of the software. These capabilities enable SCM systems to address the requirements of organizations that produce and release new or modified software.

However, in a large scale global SCM environment, the SCM tools are insufficient for performing activities such as data collection and aggregation from various data sources, visualization of the data, and monitoring using the data. In addition, a large support staff is required to manage such a large and globally dispersed SCM environment. Further, it becomes difficult to manage a large and globally dispersed SCM environment from a central location.

BRIEF DESCRIPTION OF THE DRAWINGS

FIG. 9 illustrates a screenshot of an administration console in accordance with an embodiment of the present invention.

FIG. 14 illustrates yet another screenshot of a portal for providing information in a configuration management environment in accordance with an embodiment of the present invention.

FIG. 16 illustrates yet another screenshot of a portal for providing information in a configuration management environment in accordance with an embodiment of the present invention.

FIG. 17 illustrates yet another screenshot of a portal for providing information in a configuration management environment in accordance with an embodiment of the present invention.

FIG. 19 illustrates yet another screenshot of a portal for providing information in a configuration management environment in accordance with an embodiment of the present invention.

DETAILED DESCRIPTION OF EMBODIMENTS OF THE INVENTION

Embodiments of the present invention provide methods, systems, and machine-readable media for managing a configuration management environment. In the description herein for embodiments of the present invention, numerous specific details are provided, such as examples of components and/or methods, to provide a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

In a configuration management environment, development processes are performed on a number of infrastructure devices used by a number of users. Each infrastructure device has a Configuration Management (CM) system. A large number of infrastructure devices and users are present in a large configuration management environment, which is dispersed in a geographically wide area. Managing the large configuration management environment includes collecting information related to the infrastructure devices and the users, and subsequently providing the collected information to administrators. The administrators, also located in the geographically wide area, use the collected information to manage the configuration management environment. According to an embodiment of the present invention, the collected information is provided through an access point to the administrators, to manage the configuration management environment. According to an embodiment of the present invention, the access point is a portal. A portal is defined as a website or a service that provides access to a number of sources of information and facilities, such as search engines, e-mail, links of data sources, links to other websites etc.

The portal provides an interface for interfacing the users and the collected information. The interface can be a web interface, an application or a set of command line interfaces, or a combination of them. The administrator can access the collected information through the interface. The administrators use the collected information to manage the configuration management environment. This enables the administrators to manage the infrastructure devices located in the geographically wide area, without the time consuming and complex process of accessing and monitoring each infrastructure device. Further, the development processes can be synchronized across the world. Such a system facilitates the management of the configuration management environment of any large organization.

Figure 1:
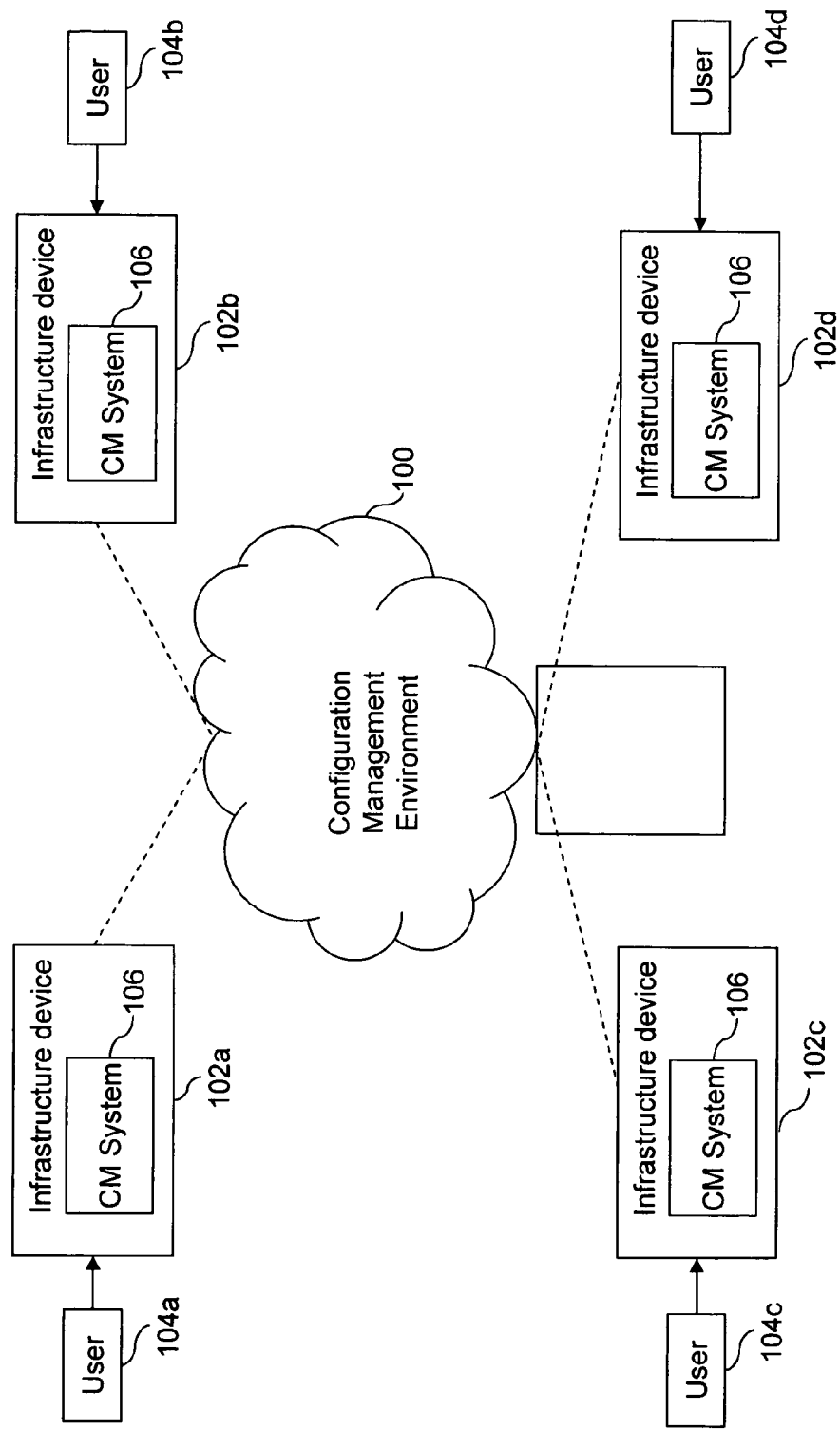
FIG. 1 illustrates a typical configuration management environment for implementing the embodiments of the present invention.

Referring to the figures now, particularly by their reference numerals, FIG. 1 illustrates a typical configuration management environment for implementing embodiments of the present invention. Configuration management environment 100 includes a number of infrastructure devices and a number of users using the infrastructure devices. However, for the purpose of illustration, only four infrastructure devices, infrastructure device 102a used by user 104a, infrastructure device 102b used by user 104b, infrastructure device 102c used by user 104c and infrastructure device 102d used by user 104d are shown in FIG. 1. Network infrastructure devices 102 are devices in a network that are used in development processes by users 104. Network infrastructure devices 102 are dispersed at various locations in a geographically wide area. Examples of network infrastructure devices 102 include, but are not limited to, servers, hosts, work stations, storage devices, etc. Further, Configuration Management (CM) system 106 is installed in infrastructure devices 102. A number of development processes are executed in configuration management environment 100.

Configuration management environment 100 can be a software configuration management environment, which is a configuration management environment in which the development processes related to software are performed. The development processes involve preparation and modification of files related to the development processes. The files include documents, source codes, images, etc. Further, the development processes include a number of developers working simultaneously on the files. As a result, a number of versions of the files are prepared. The versions of the files are combined in a single file to accomplish the development processes. Therefore, tracking the versions of the files, and also tracking the developers who modify the files, becomes important. In addition, tracking the versions of the files includes tracking metadata related of the versions of the files. The tracking of metadata becomes complex when the versions of the files become large in number. In addition, there are a set of rules, which dictate how the versions of the files are selected. The rules relate to identification of the development processes, developers modifying the files, the version numbers and timestamps of the versions of the files.

CM system 106 is installed in infrastructure devices 102 for managing the versions of the files in configuration management environment 100. CM system 106 refers to a system for controlling changes that are made to hardware, software, firmware, and documentation throughout a system's lifecycle. In particular, CM system 106 manages the development processes in configuration management environment 100, by identifying the exact state, composition and configuration of infrastructure devices 102, in order to control the changes. Further, CM system 106 ensures traceability of the development processes. CM system 106 is referred to as Software Configuration Management (SCM) system in case of the software configuration management environment.

CM system 106 establishes and maintains the integrity of the software development processes throughout the lifecycle of the software. CM system 106 identifies the configuration of the software at various points of times, systematically controlling changes to the configuration, and managing the integrity and traceability of the configuration throughout the lifecycle of the software. Examples of CM system 106 include, but are not limited to, ClearCase (including MultiSite, ClearGuide, ClearDDTS and ClearQuest), Concurrent Versions Systems (CVS), Visual SourceSafe, Perforce, Accu-Rev, BitKeeper, SpectrumSCM, Starbase, Merant PVCS, Telelogic CM Synergy, RCS, SVK, Vesta, Montone, Starbase, Sun Teamware, Seapine, Aegis, SCCS, Git, Alien Brain, Bazaar, SourceGear Vault, StarTeam, Subversion, Surround, VSS, VSS Journal, Roundtable, and AllFusion Endevor.

Figure 1A:
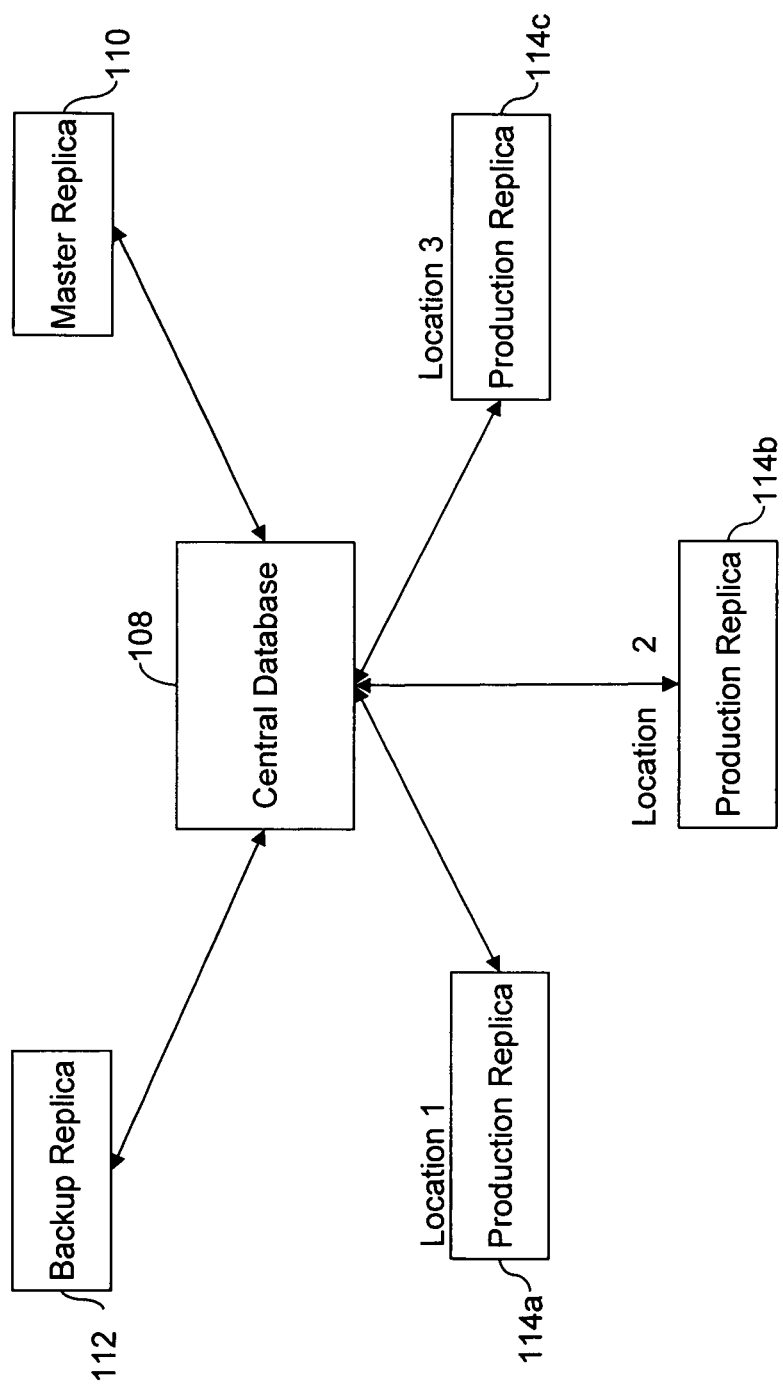
FIG. 1a illustrates a global arrangement of databases of a CM system in a configuration management environment in accordance with an embodiment of the present invention.

FIG. 1a illustrates a global arrangement of databases of CM system 106 in configuration management environment 100 in accordance with an embodiment of the present invention. In configuration management environment 100, central database 108, master replica 110, backup replica 112, and production replica 114a at location 1, production replica 114b at location 2 and production replica 114c at location 3 are present. It is to be understood that any number of production replicas can be present in environment 100 and the number shown in FIG. 1a was selected to illustrate this embodiment.

In case of configuration management environment 100, which is dispersed in the geographically wide area, CM system 106 enables users 104, also dispersed in the geographically wide area at various locations, to perform the software development processes in parallel. In such a scenario, CM system 106 maintains central database 108. Central database 108 contains data that is shared by users 104. This data includes historical and ongoing versions of source files, along with derived objects built from the source files by compliers, linkers, etc. Further, the data includes the accounting data of the software development processes. The accounting data includes details related to the developer who created a particular version of the source file, details related to why the developer created the particular file, and also when the file was created. This ensures orderly evolution of central database 108 and minimizes the possibility of accidental damage or malicious destruction of the source files or the derived objects.

According to an embodiment of the present invention, copies of central database 108 are dispersed in the geographically wide area at the various locations. Production replica 114a at location 1, production replica 114b at location 2 and production replica 114c at location 3 constitute the copies of central database 108. Locations 1, 2 and 3 are dispersed in the geographically wide area and production replicas 114 are used by users 104 working at that location. At any time, users 104 at locations 1, 2 and 3 can propagate the changes made in their production replica to the other production replicas that are located at other locations. The changes can further be sent to central database 108 as well. This allows users 104 to perform the software development processes in parallel through automatic or manual synchronization of production replicas 114.

In an embodiment of the present invention, locations 1, 2 and 3 are present at east coast of the USA, west coast of the USA and overseas of the USA. Further, central database 108 is maintained at a central location in the USA. In the geographically wide area, at the central location, at most one master replica 110 of central database 108 is maintained. At least one backup replica 112 of central database 108 is used in the event of loss of data from central database 108.

Further, each software development process is stored in central database 108 in the form of a tree structure. The software development process tree refers to the structure of how the files related to the software are stored in CM system 106. Each software development process tree is stored as a repository. The repository in case of ClearCase configuration management system is known as Versioned Object Base (VOB). Users 104 access the repositories through infrastructure devices 102. The repository includes information related to the version of the files related to the software development processes. Users 104 access the repositories and modify the files through a workspace, which provides dynamic access to the repository. A workspace used for working on the software development process by a user is referred to as a virtual workspace. However, the changes made to a file in one virtual workspace are invisible to another virtual workspace. Central database 108 also stores information related to the virtual workspaces, which can be worked upon through infrastructure devices 102.

Figure 2:
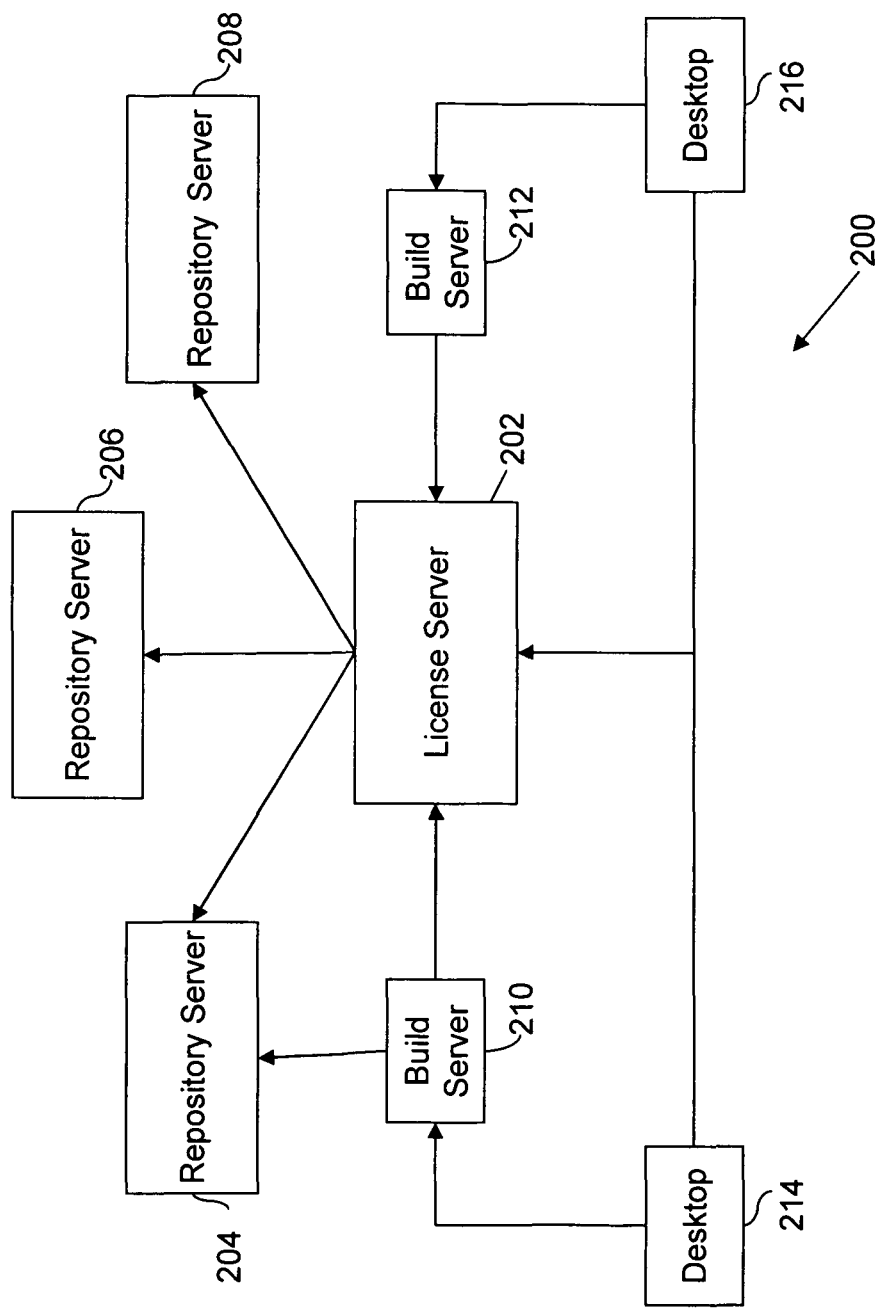
FIG. 2 illustrates infrastructure devices present in a configuration management environment in accordance with an embodiments of the present invention.

FIG. 2 illustrates an infrastructure devices present in configuration management environment 100 in accordance with embodiments of the present invention. Various infrastructure devices include license server 202; repository servers 204, 206, and 208; build servers 210 and 212; and end infrastructure devices such as desktops 214 and 216.

The infrastructure devices in configuration management environment 100 are arranged according to a specific architecture. According to this architecture, license server 202 manages license usages and provides licenses to repository servers 204, 206 and 208; build servers 210 and 212; and desktops 214 and 216. Desktop 214 is connected to repository server 204, and desktop 216 is connected to repository server 208, enabling users 104 to access the repositories.

The architecture provides license server 202, which enables licensed software to run on infrastructure devices 102 in configuration management environment 100. License server 202 is installed as a service on an infrastructure device, and ensures that as many copies of software as have been licensed are allowed to run on infrastructure devices 102. License server 202 provides licenses and registry services to repository servers 204, 206, and 208.

Repository servers 204, 206, and 208 host repository databases in configuration management environment 100. A repository database refers to a database that includes information related to repositories. Repository servers 204, 206 and 208 provide information related to repositories to users 104. Users 104 use the information related to the repositories to work on the software development processes. Repository servers 204, 206 and 208 can be Network Attached Storage (NAS) devices or Storage Area Network (SAN) devices for repository storage. Storing repositories on NAS and SAN devices provides a large storage space for repositories, enhances the scalability and flexibility of repositories, and simplifies the administration configuration management environment 100.

Build servers 210 and 212 host build databases in configuration management environment 100. A build database refers to a database that includes information related to the virtual workspaces of a repository. Build servers 210 and 212 provide information related to the virtual workspaces of a repository to users 104 using infrastructure devices 102 to work on the software development processes. Build servers 210 and 212 can be NAS or SAN devices for storage of the virtual workspaces. Storing virtual workspaces on NAS and SAN devices provides a large storage space for virtual workspaces, enhances the scalability and flexibility of virtual workspace, and simplifies the administration of configuration management environment 100.

Desktops 214 and 216 are end infrastructure devices from where users 104 work on the software development processes. Desktops 214 and 216 can be client's computers through which users 104 can work on the virtual workspaces and the repositories, and work on the files related to the software development processes.

Figure 3:
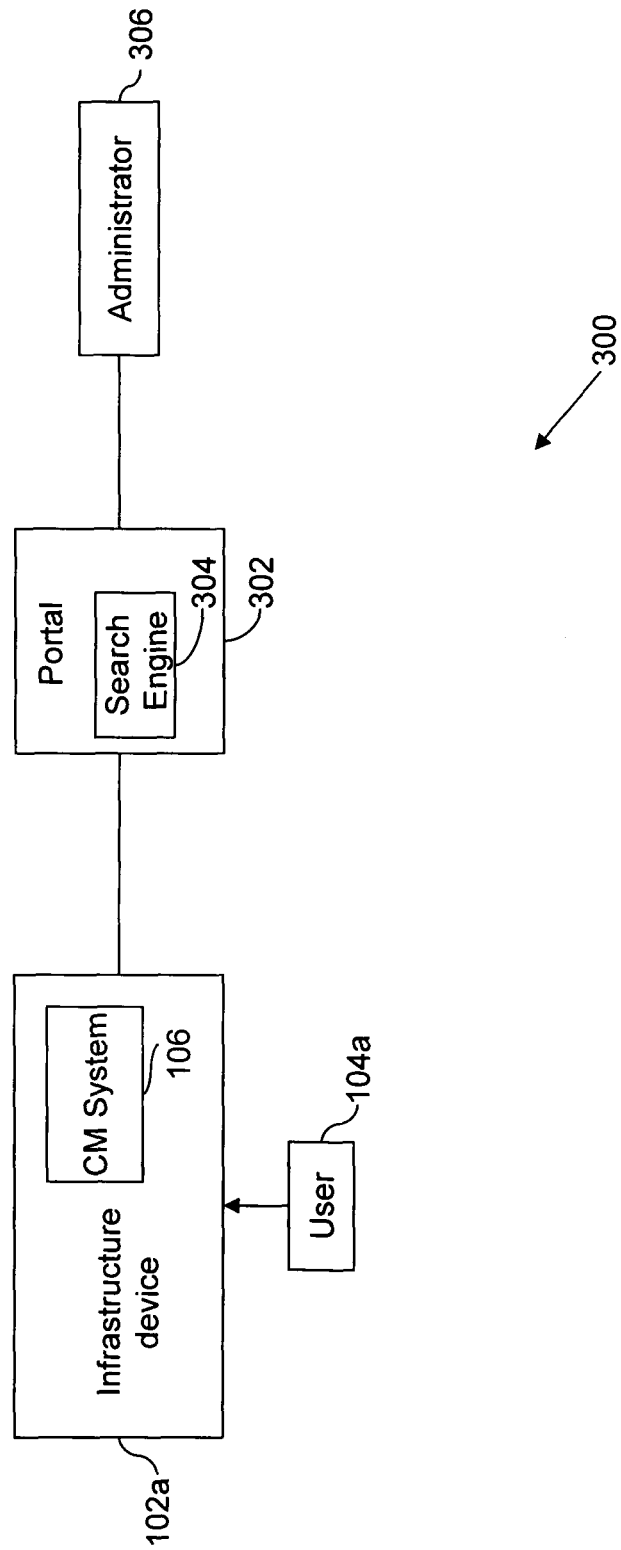
FIG. 3 illustrates a system for managing a configuration management environment in accordance with an embodiment of the present invention.

FIG. 3 illustrates a system for managing configuration management environment 100 in accordance with an embodiment of the present invention. For purpose of illustration, system 300 is shown to include infrastructure device 102a, user 104a, CM system 106, portal 302, search engine 304 and administrator 306.

User 104a uses infrastructure device 102a that has CM system 106 installed to perform the software development processes. Administrator 306 manages infrastructure device 102a, user 104a, and CM system 106 in configuration management environment 100. Administrator 306 accesses portal 302 to obtain information related to infrastructure device 102a, user 104a, CM system 106, and the software development processes in configuration management environment 100.

Portal 302 can also be referred to as Configuration Management portal. Portal 302 provides an interface between portal 302 and administrator 306. The interface can be a web interface providing access to the information related to infrastructure device 102a, user 104a, and CM system 106, and the software development processes. The web interface is an interface between users 104, which accepts input and provides output by generating web pages that are viewed by administrator 304 using a browzer program. Further, the portal makes available a set of command line interfaces that provide specific information, as desired by administrator 306. This specific information refers to the information about one particular aspect of configuration management environment 100 that users 104 are interested in. Portal 302 allows users 104 to obtain the specific information through search engine 304. Further, portal 302 includes programs that collect information from CM system 106, wherein the information is related to configuration management environment 100. These programs are software programs that can also be referred to as administration tools, which function as a means for collecting information related to configuration management environment 100. Further, means for providing the collected information include portal 302.

Figure 4:
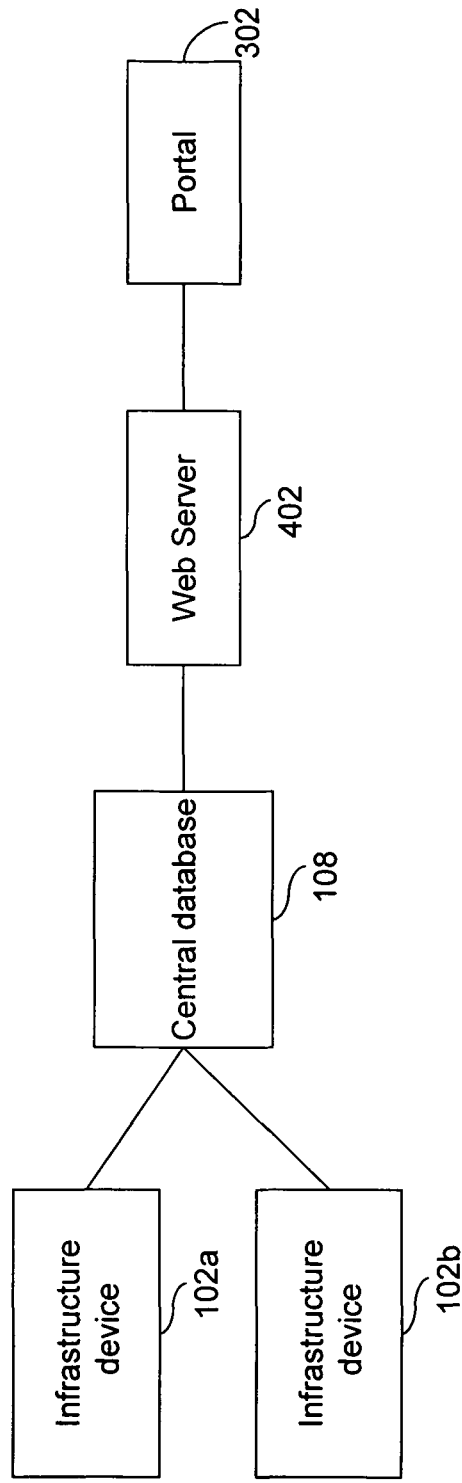
FIG. 4 illustrates a block diagram representing the flow of information in a configuration management environment in accordance with an embodiment of the present invention.

FIG. 4 illustrates a block diagram representing flow of information in configuration management environment 100 in accordance with an embodiment of the invention. Information is collected from infrastructure devices 102, stored in central database 108 and is made available to administrator 306 through portal 302. Portal 302 is present in web server 402. Information related to infrastructure devices 102 is collected by programs and is stored in central database 108. The changes made in central database 108 are synchronized across master replica 110, backup replica 112 and production replicas 114 of central database 108. The collected information, which is stored in central database 108, is provided through portal 302, which resides on web server 402. Further, portal 302 includes the administration tools and other means for collecting information and providing the collected information to users 104. The information collected by the administration tools can be provided to administrator 306 through an administration console. This administration console is an interface that provides information related to faults or problems occurring in configuration management environment 100. These faults and problems need to be rectified by administrator 306. The administration console is discussed in detail in conjunction with FIG. 9.

Figure 5:
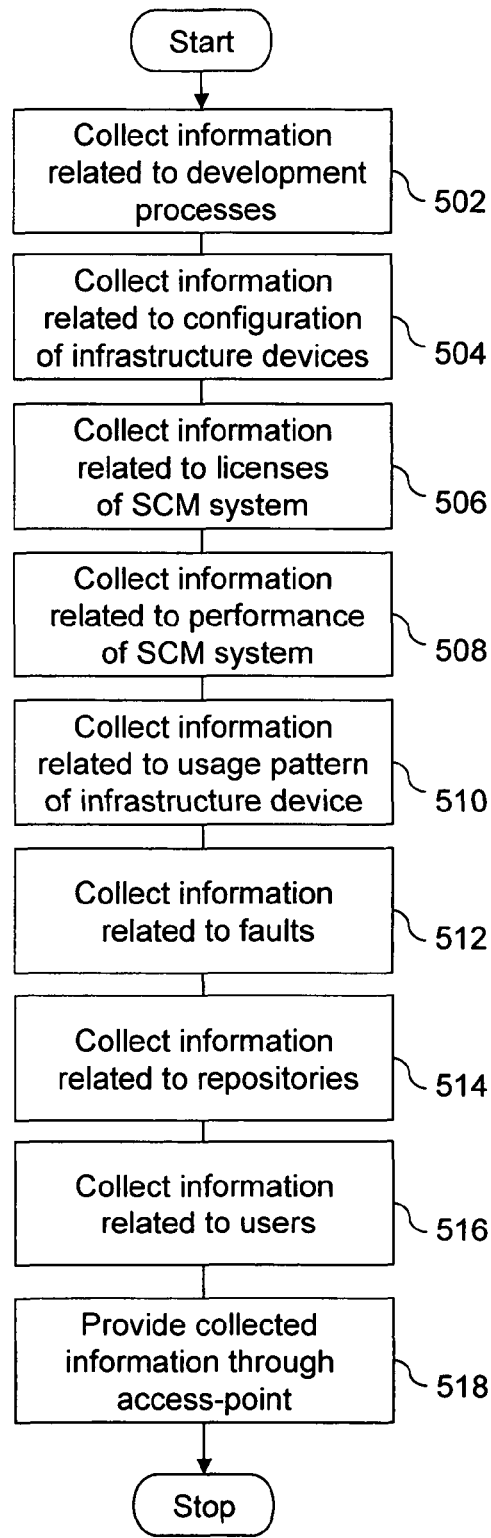
FIG. 5 illustrates a flowchart of a method for managing a configuration management environment in accordance with an embodiment of the present invention.

FIG. 5 illustrates a flowchart of a method for managing configuration management environment 100 in accordance with an embodiment of the present invention. At 502, information related to the development processes is collected. Information related to the software development processes is collected in configuration management environment 100 by the administration tools.

At 504, information related to the configuration of infrastructure devices 102 is collected. At 506, information related to licenses of CM system 106 is collected. At 508, information related to the performance of CM system 106 is collected. At 510, information related to the usage pattern of infrastructure devices 102 is collected. At 512, information related to faults, which occur in configuration management environment 100 is collected. At 514, information related to the repositories is collected. At 516, information related to users 104 is collected.

Further, the collected information is obtained from various data sources. These data sources refer to sources that provide information related to various aspects of CM system 106 in configuration management environment 100. The data sources include application metrics, based on the attributes of CM system 106, repository metrics, based on the attributes of the repositories, virtual workspace metrics, based on the attributes of the virtual workspaces, information related to the application of CM system 106 distributed at various locations in the geographically wide area, host performance metrics, based on the performance attributes of a host and the user information-reporting structure. This user information-reporting structure provides information related to users 104.

At 518, the collected information is provided to administrator 306 through an access point. This access point is portal 302. Portal 302 provides the collected information to administrator 306, to manage configuration management environment 100. Administrator 306 is selected from users 104. Administrator 306 obtains the collected information and manages the software development processes.

Portal 302 provides the collected information, which can be used for various purposes for example, immediate trouble shooting, planning, and improving configuration management environment 100. These features have been described in great detail in conjunction with FIGS. 6, 7 and 8 in the following paragraphs.

Figure 6:
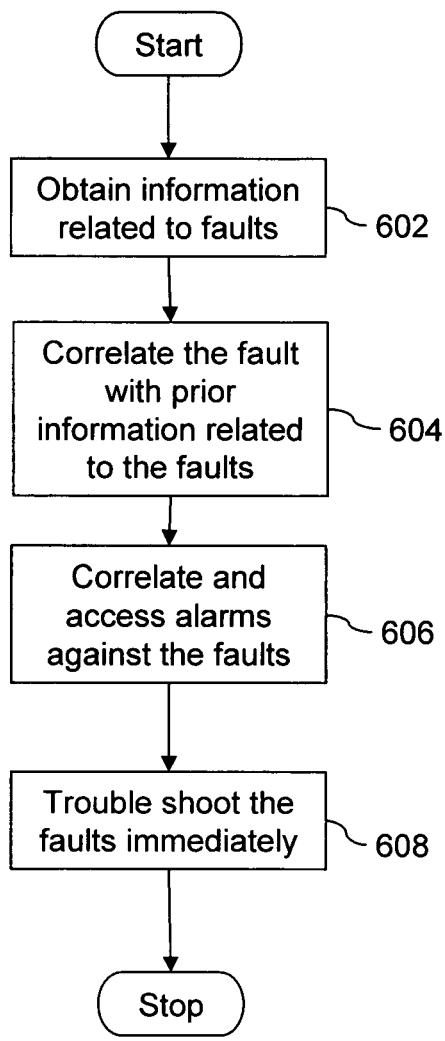
FIG. 6 illustrates a flowchart depicting troubleshooting of faults in a configuration management environment in accordance with an embodiment of the present invention.

FIG. 6 illustrates a flowchart depicting troubleshooting of faults in configuration management environment 100 in accordance with an embodiment of the present invention. At 602, information related to faults occurring in configuration management environment 100 is obtained from portal 302. At 604, information related to the faults is correlated with the prior information related to the faults. The prior information related to the faults includes fault and configuration history such as location of the faults, pattern of occurrence of the faults, relation among the faults etc. At 606, alarms against the faults are correlated and accessed by administrator 306. At 608, administrator 306 immediately troubleshoots the faults occurring in configuration management environment 100.

Figure 7:
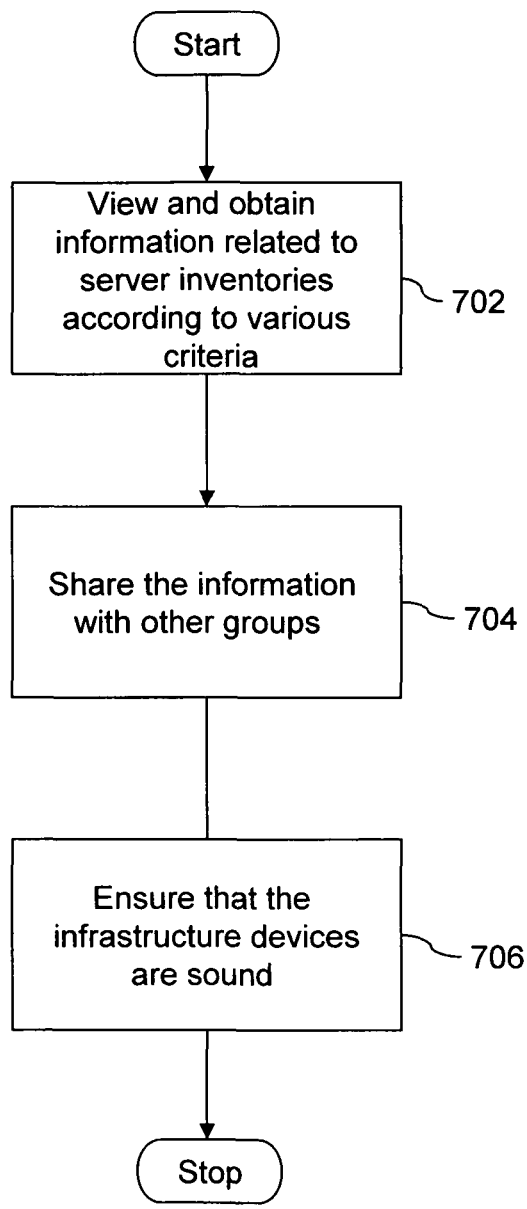
FIG. 7 illustrates a flowchart depicting long-term planning by administrator in accordance with an embodiment of the present invention.

FIG. 7 illustrates a flowchart depicting long-term planning by administrator 306 in accordance with an embodiment of the present invention. At 702, administrator views server-inventories based on a variety of criteria such as geographical variation, type of server, etc. At 704, administrator 306 shares data with other users from various groups, such as IT, system administration, etc. At 706, administrator 306 ensures that infrastructure devices 102 are sound in all respects and are used optimally. Administrator 306 enables and disables synchronization of CM system 106 across various locations distributed in the geographically wide area. The synchronization of CM system 106 across various locations enables users 104 to work on the software development processes simultaneously. In addition, according to the collected information, as obtained from portal 302, administrator 306 makes plans to improve the functionality of infrastructure devices 102.

Figure 8:
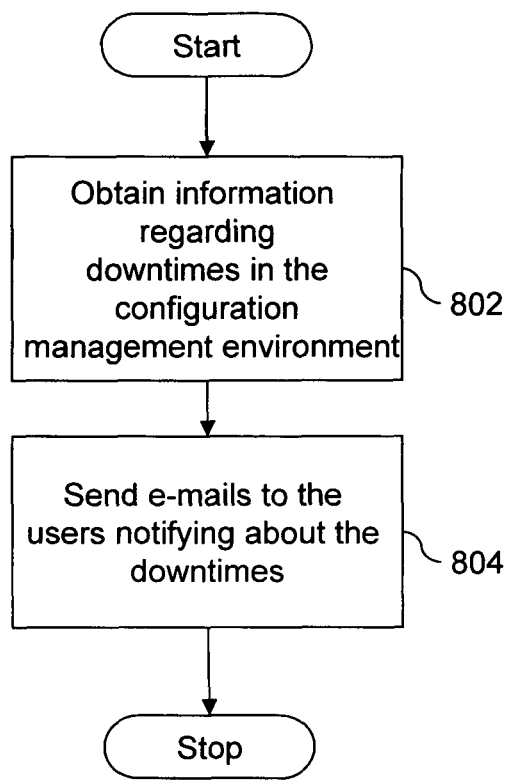
FIG. 8 illustrates a flowchart for notifying about a downtime in a configuration management environment in accordance with an embodiment of the present invention

FIG. 8 illustrates a flowchart for notifying about a downtime in configuration management environment 100 in accordance with an embodiment of the present invention. At 802, administrator 306 obtains information regarding upcoming downtimes in configuration management environment 100. At 804, administrator 306 sends e-mails to users 104, notifying them about the upcoming downtime and provides information about start and stop times for the downtime, description of the remedy of the downtime, affected applications, system failure, etc. Further, administrator 306 sends notifications regarding the downtimes along with the e-mails to users 104. In addition, administrator 306 assigns a ticket number to the problems submitted by users 104, and provides a solution to the problems. As a result, portal 302 provides the information from various sources, used by administrator 306 to manage configuration management environment 100.

Figure 9:
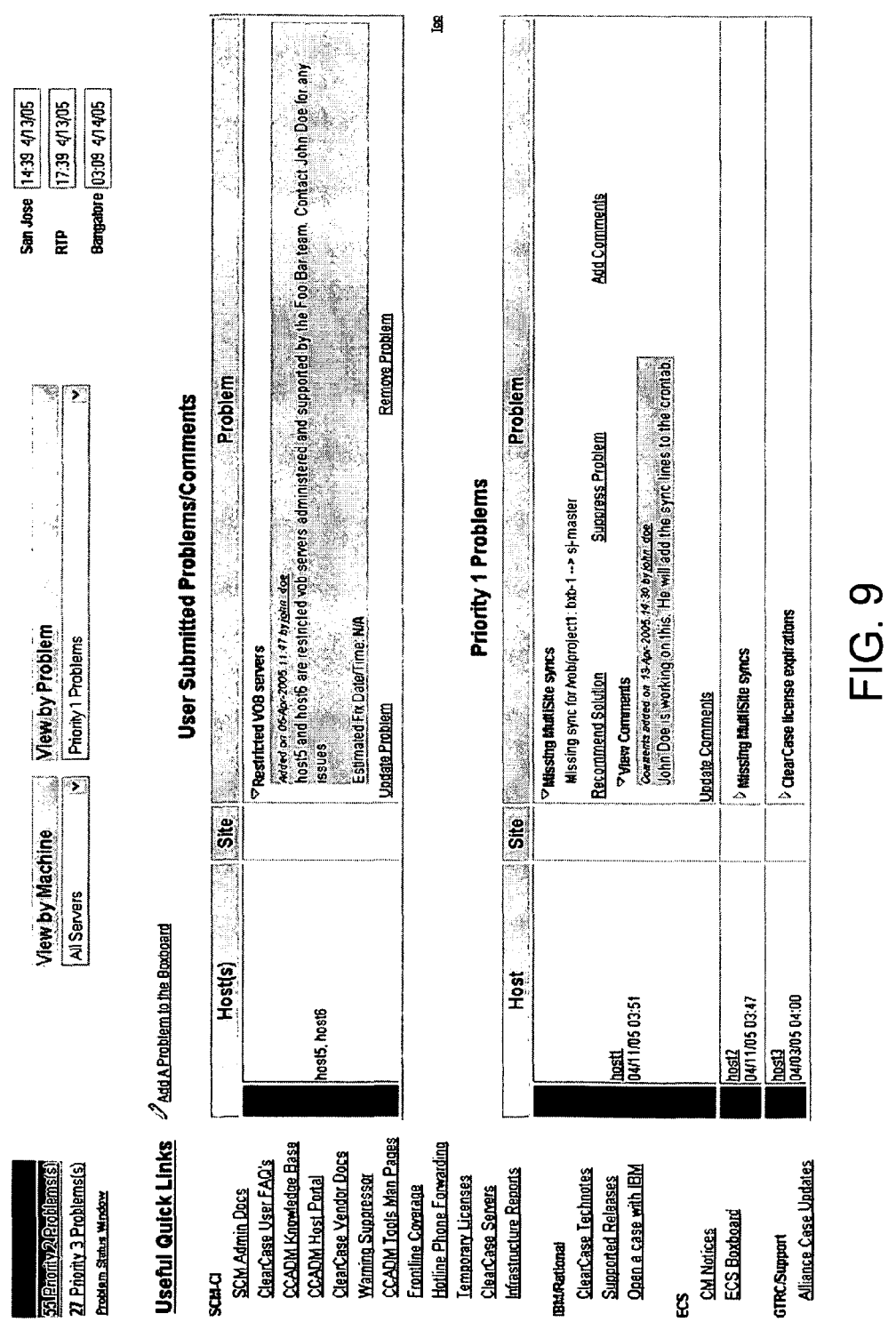

FIG. 9 illustrates a screenshot of an administration console in accordance with an embodiment of the present invention. The screenshot provides an exemplary illustration of the administration console. The administration console is dynamically updated and displays problems that are active and need to be rectified by administrator 306. Users 104 can also submit their problems on the administration console. The problems are assigned priorities and administrator 306 solves them according to their assigned priority. Further, administrator 306 can add comments related to the rectification of the problems. Therefore, administrator 306 immediately troubleshoots problems, accesses alarms, correlates the alarms and takes measure for improvement to avoid re-occurrence of such problems that occur in configuration management environment 100. Also in the description herein for embodiments of the present invention, a portion of the disclosure recited in the specification contains material, which is subject to copyright protection. Computer program source code, object code, instructions, text, interface design, design of web interface or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

Figure 10:
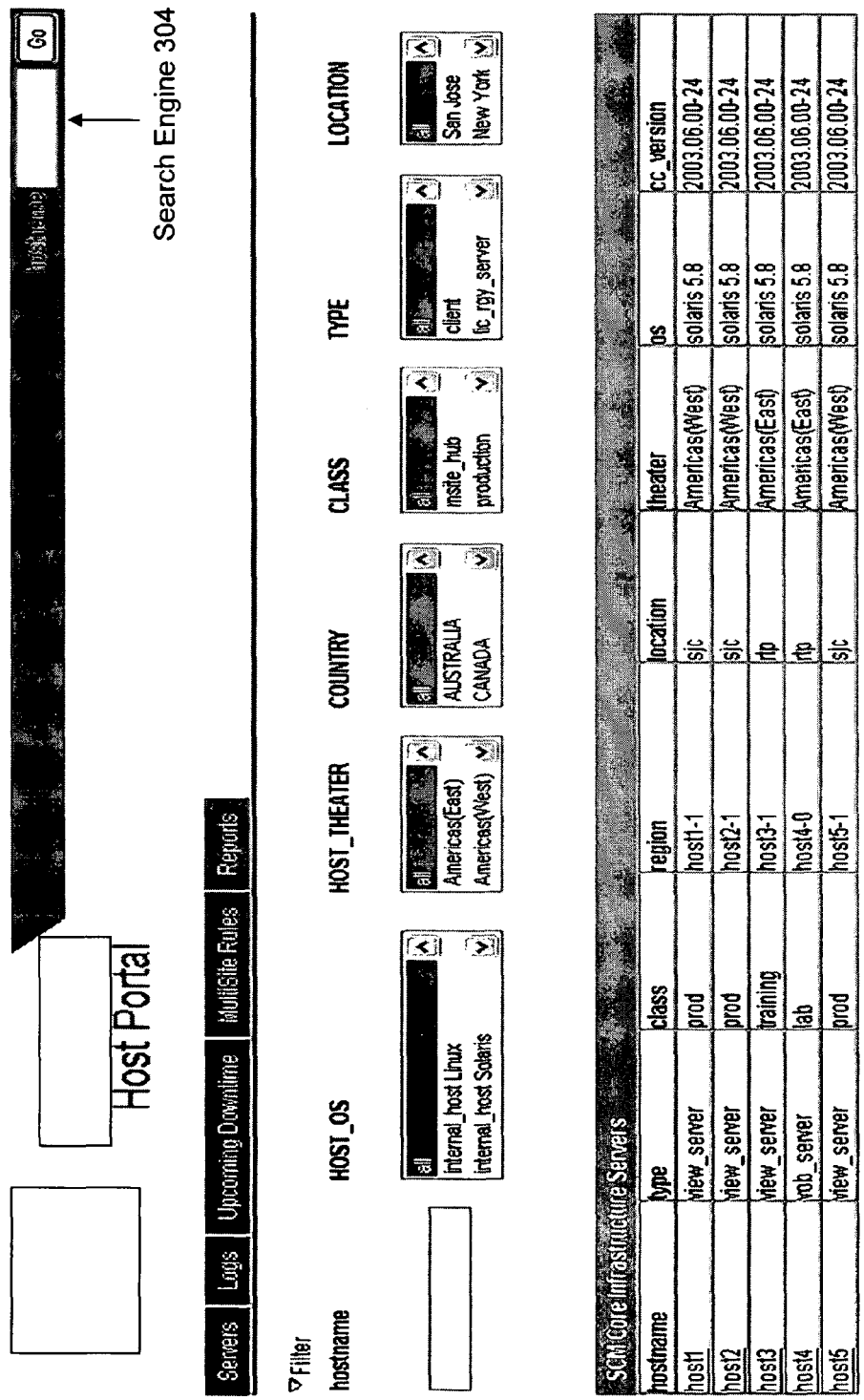
FIG. 10 illustrates a screenshot of a portal for providing information in a configuration management environment in accordance with an embodiment of the present invention.

FIG. 10 illustrates a screenshot of portal 302 for providing information in configuration management environment 100 in accordance with an embodiment of the present invention. The screenshot provides an exemplary illustration of portal 302. Portal 302 provides information related to infrastructure devices 102. Further, portal 302 provides a search engine 304, which enables administrator 306 to search for information related to a particular infrastructure device by referring to the name of the infrastructure device. Furthermore, portal 302 provides options for obtaining information related to various server types, logs, upcoming downtimes, rules and reports for application of CM system 106 across various locations in the geographically wide area. Selecting appropriate options from drop-down menus under various categories enables administrator 306 to search for infrastructure devices 102. The various categories include the type of operating system (OS), the geographical location, and the type of infrastructure device. Also in the description herein for embodiments of the present invention, a portion of the disclosure recited in the specification contains material, which is subject to copyright protection. Computer program source code, object code, instructions, text, interface design, design of web interface or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

Figure 11:
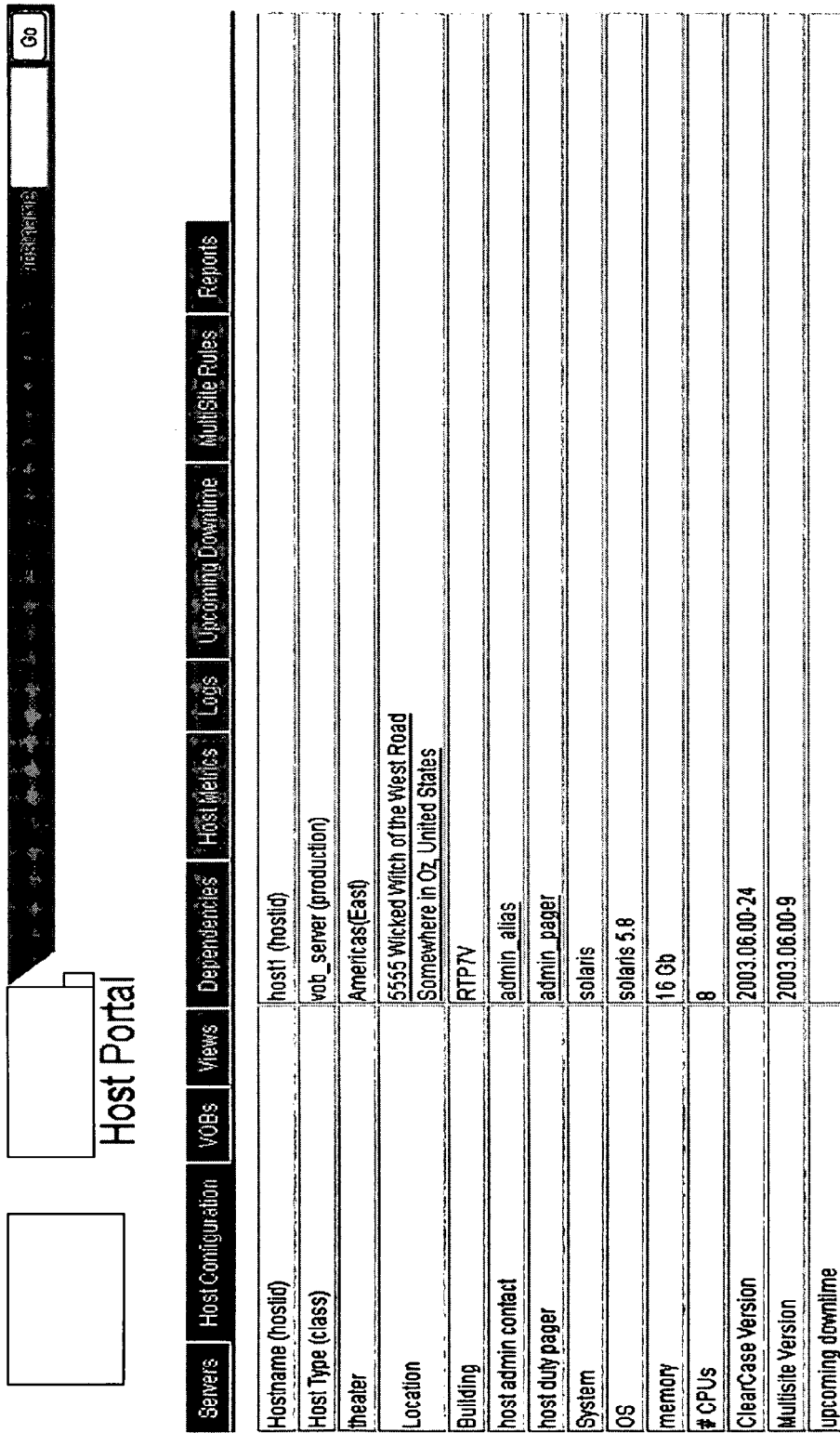
FIG. 11 illustrates another screenshot of a portal for providing information in a configuration management environment in accordance with an embodiment of the present invention.

FIG. 11 illustrates another screenshot of portal 302 for providing information in configuration management environment 100 in accordance with an embodiment of the present invention. The screenshot provides another exemplary illustration of portal 302. Portal 302 provides various buttons for obtaining information related to various types of servers in configuration management environment 100, the configurational details of infrastructure devices 102, the repositories, the virtual workspaces, the dependencies of the repositories, as well as the virtual workspaces, the various metrics related to infrastructure devices 102, the upcoming downtimes of infrastructure devices 102, the rules related to the operations of CM system 106 across various locations in the geographically wide area, and the reports related to the various fields of configuration management environment 100. On clicking the appropriate button, administrator 306 obtains information in tabular form, which is classified according to various categories, such as the type of infrastructure device, the geographical location of the infrastructure device, the operating system of the infrastructure device, the memory of the infrastructure device, the number of Central Processing Units (CPUs) connected to the infrastructure device, the version of CM system 106 running on the infrastructure device, and the upcoming downtime, if there are any. Also in the description herein for embodiments of the present invention, a portion of the disclosure recited in the specification contains material, which is subject to copyright protection. Computer program source code, object code, instructions, text, interface design, design of web interface or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

Figure 12:
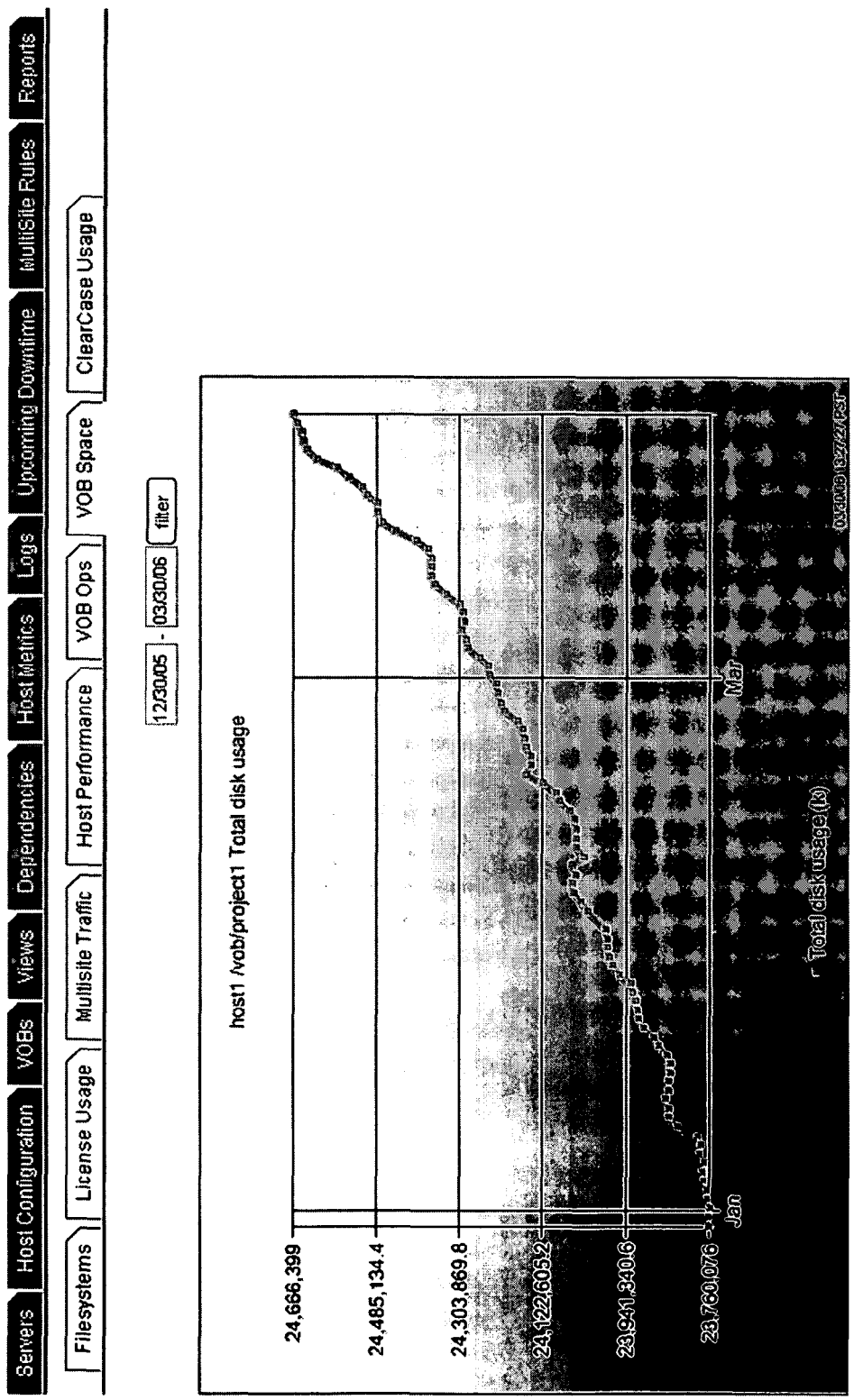
FIG. 12 illustrates yet another screenshot of a portal for providing information in a configuration management environment in accordance with an embodiment of the present invention.

FIG. 12 illustrates yet another screenshot of portal 302 for providing information in configuration management environment 100 in accordance with an embodiment of the present invention. The screenshot provides another exemplary illustration of portal 302. Portal 302 provides information related to infrastructure devices 102 and the usage pattern of the repositories. This includes information related to the entire repository in graphical and textual form, as well as the memory and the disk usage of the repository database, the repository sources, the repository cache, and repository-derived objects. This information can be obtained in a graphical form by obtaining charts generated by CM system 106 or other third party tools such as Corda Pop Charts and GraphViz. Furthermore, information related to the licenses of CM system 106, running on infrastructure devices 102, is also provided. Also in the description herein for embodiments of the present invention, a portion of the disclosure recited in the specification contains material, which is subject to copyright protection. Computer program source code, object code, instructions, text, interface design, design of web interface or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

Figure 13:
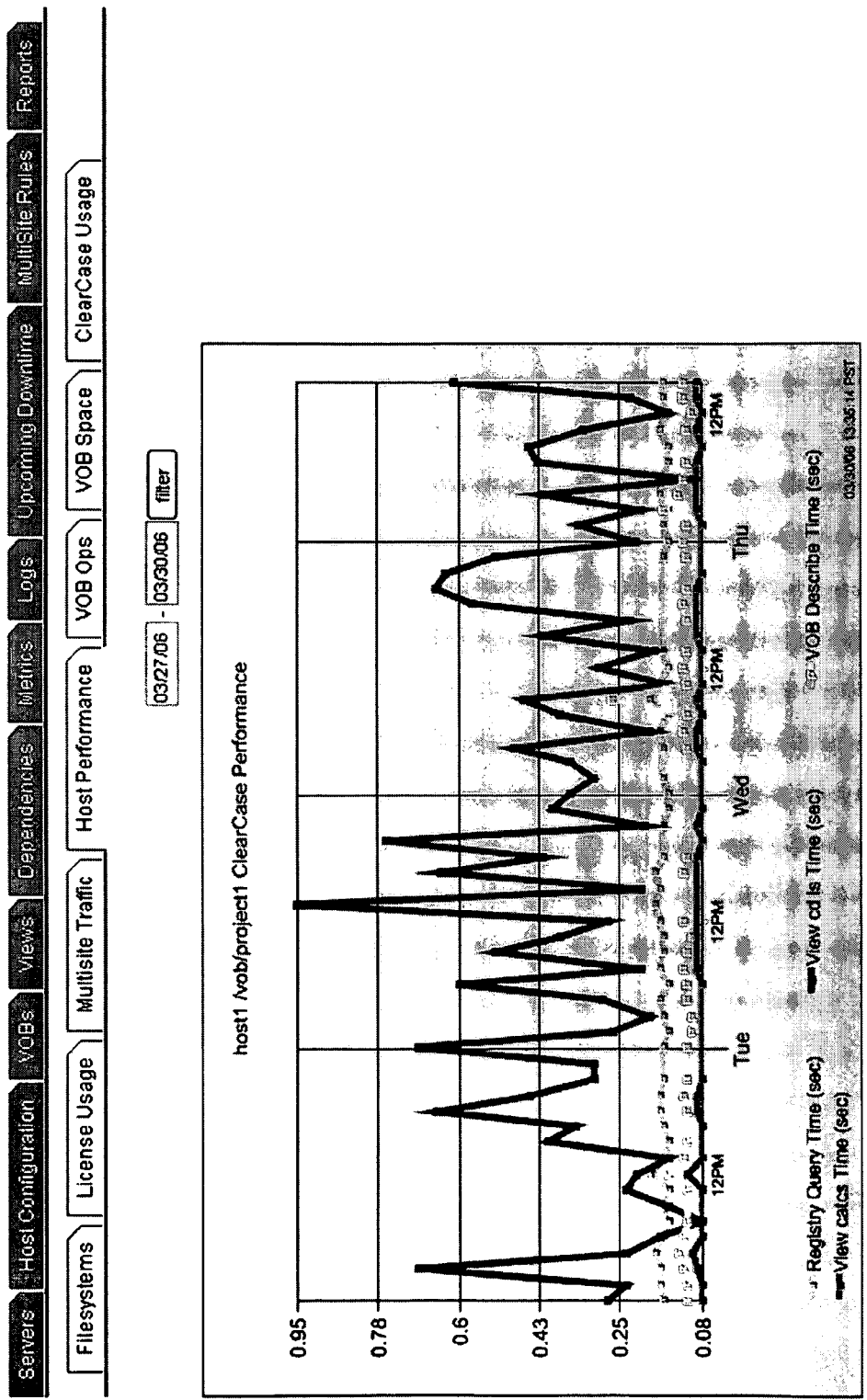
FIG. 13 illustrates yet another screenshot of a portal for providing information in a configuration management environment in accordance with an embodiment of the present invention.

FIG. 13 illustrates yet another screenshot of portal 302 for providing information in configuration management environment 100 in accordance with an embodiment of the present invention. The screenshot provides another exemplary illustration of portal 302. Portal 302 provides information related to the performance of CM system 106, running on infrastructure devices 102. Information relating to the performance includes information related to the average load on CM system 106 and infrastructure devices 102, users 104 using infrastructure devices 102, contact information of users 104, number of CPUs connected to infrastructure devices 102, CPU utilization, physical memory, swap or cache memory, etc. This information can be obtained in a graphical form by obtaining charts generated by CM system 106 or other third party tools. This information is provided on a daily basis, and therefore, can be used for comparative analysis of the performance of CM system 106. Also in the description herein for embodiments of the present invention, a portion of the disclosure recited in the specification contains material, which is subject to copyright protection. Computer program source code, object code, instructions, text, interface design, design of web interface or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

FIG. 14 illustrates yet another screenshot of portal 302 for providing information in configuration management environment 100 in accordance with an embodiment of the present invention. The screenshot provides another exemplary illustration of portal 302. Portal 302 provides the buttons for obtaining information related to various types of hosts in configuration management environment 100. The information related to the hosts includes name of the hosts, type of the hosts, geographical location of the hosts, hosts contact addresses, type of operating system running on the hosts, number of CPUs connected to the hosts, contact details of administrator 306 managing the hosts, version of CM system 106 on the hosts, type of license server 202, repository server 204, build server 210, and information related to any upcoming downtime of the host. Also in the description herein for embodiments of the present invention, a portion of the disclosure recited in the specification contains material, which is subject to copyright protection. Computer program source code, object code, instructions, text, interface design, design of web interface or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

Figure 15:
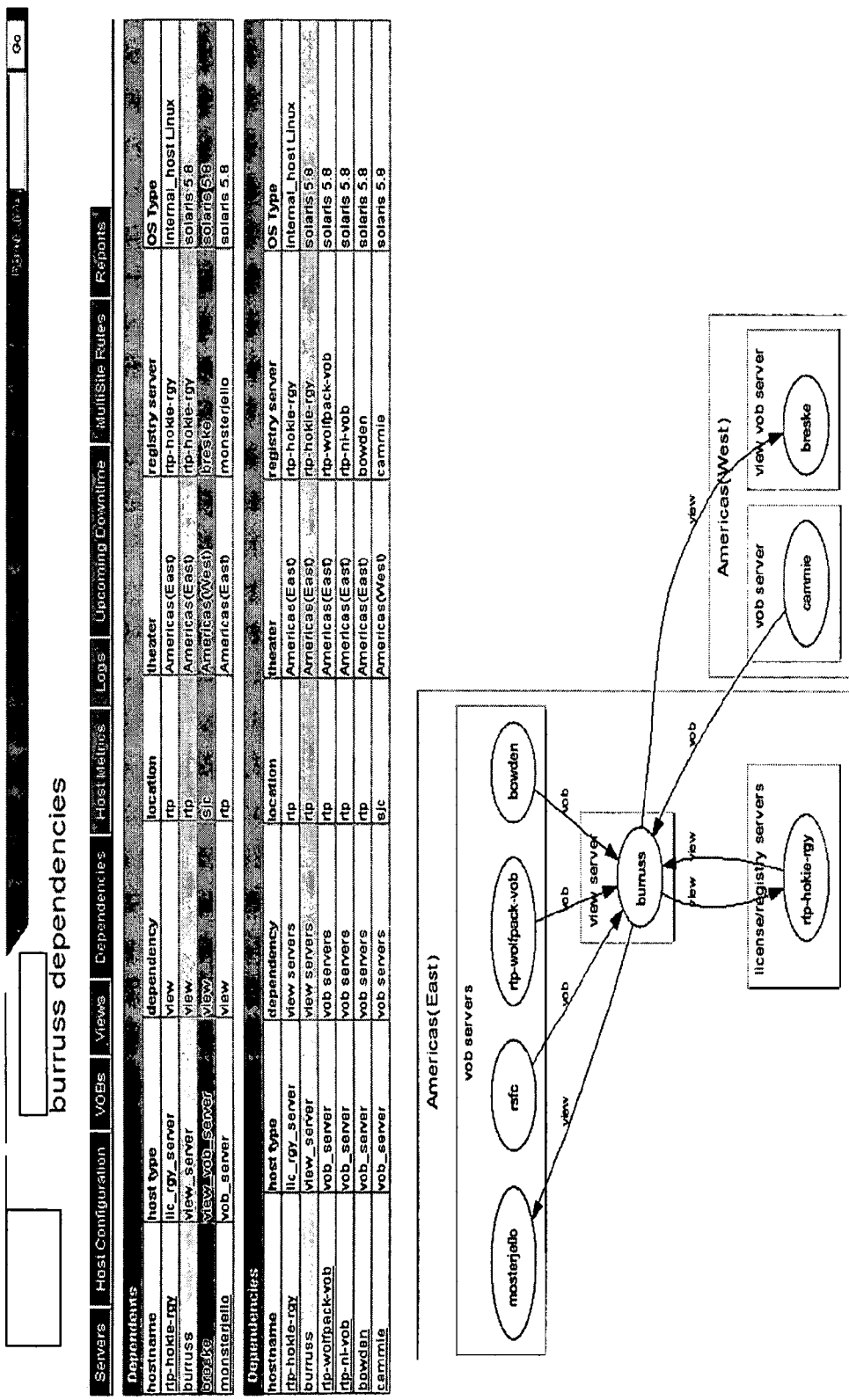
FIG. 15 illustrates yet another screenshot of a portal for providing information in a configuration management environment in accordance with an embodiment of the present invention.

FIG. 15 illustrates yet another screenshot of portal 302 for providing information in configuration management environment 100 in accordance with an embodiment of the present invention. The screenshot provides another exemplary illustration of portal 302. Portal 302 provides the buttons for obtaining information related to dependencies of a host. The dependencies of the host may be repository server 204, build server 210, other hosts etc. The dependencies may be dispersed in the geographically large area. Also in the description herein for embodiments of the present invention, a portion of the disclosure recited in the specification contains material, which is subject to copyright protection. Computer program source code, object code, instructions, text, interface design, design of web interface or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

FIG. 16 illustrates yet another screenshot of a portal for providing information in configuration management environment 100 in accordance with an embodiment of the present invention. The screenshot provides another exemplary illustration of portal 302. Portal 302 provides the buttons for obtaining information related to the upcoming downtime in configuration management environment 100. The information related to the upcoming downtime includes information regarding the start time of the downtime, stop time of the downtime, reason of downtime, location of the downtime, implementation of the downtime etc. Also in the description herein for embodiments of the present invention, a portion of the disclosure recited in the specification contains material, which is subject to copyright protection. Computer program source code, object code, instructions, text, interface design, design of web interface or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

Figure 17:
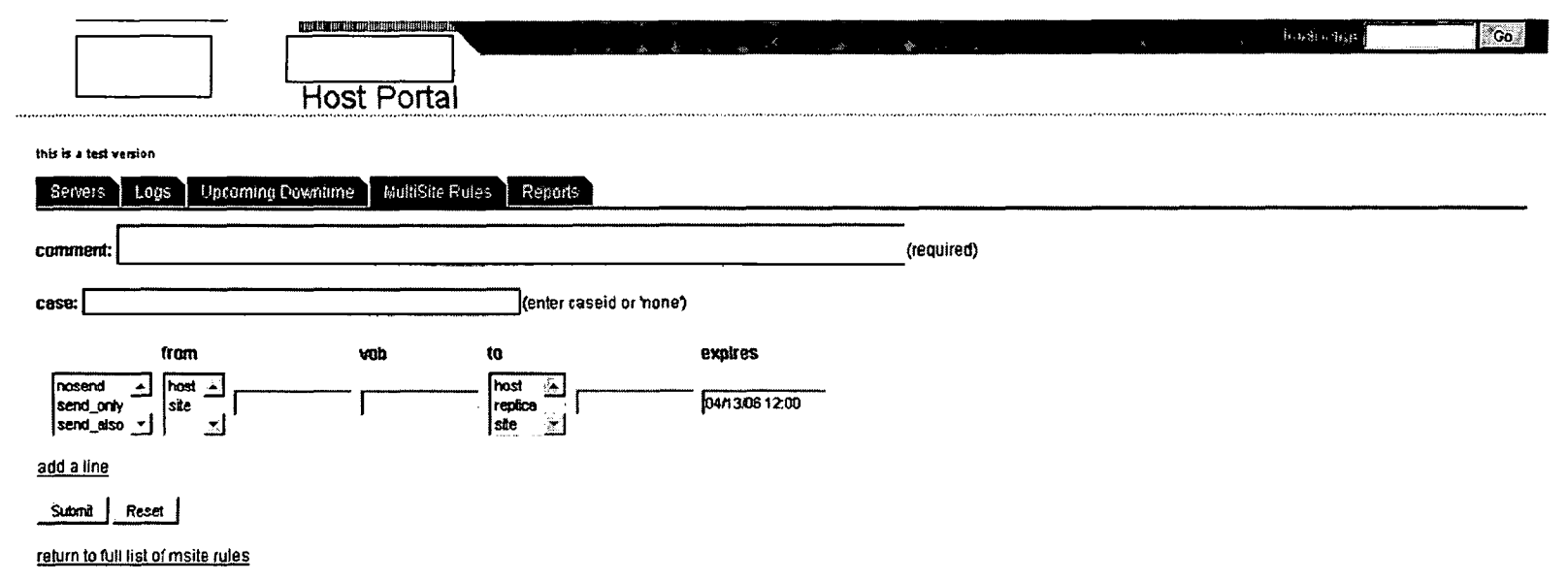

FIG. 17 illustrates yet another screenshot of portal 302 for providing information in configuration management environment 100 in accordance with an embodiment of the present invention. The screenshot provides another exemplary illustration of portal 302. Portal 302 provides rules about the implementation of CM system 106 in the geographically wide area. Also in the description herein for embodiments of the present invention, a portion of the disclosure recited in the specification contains material, which is subject to copyright protection. Computer program source code, object code, instructions, text, interface design, design of web interface or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

Figure 18:
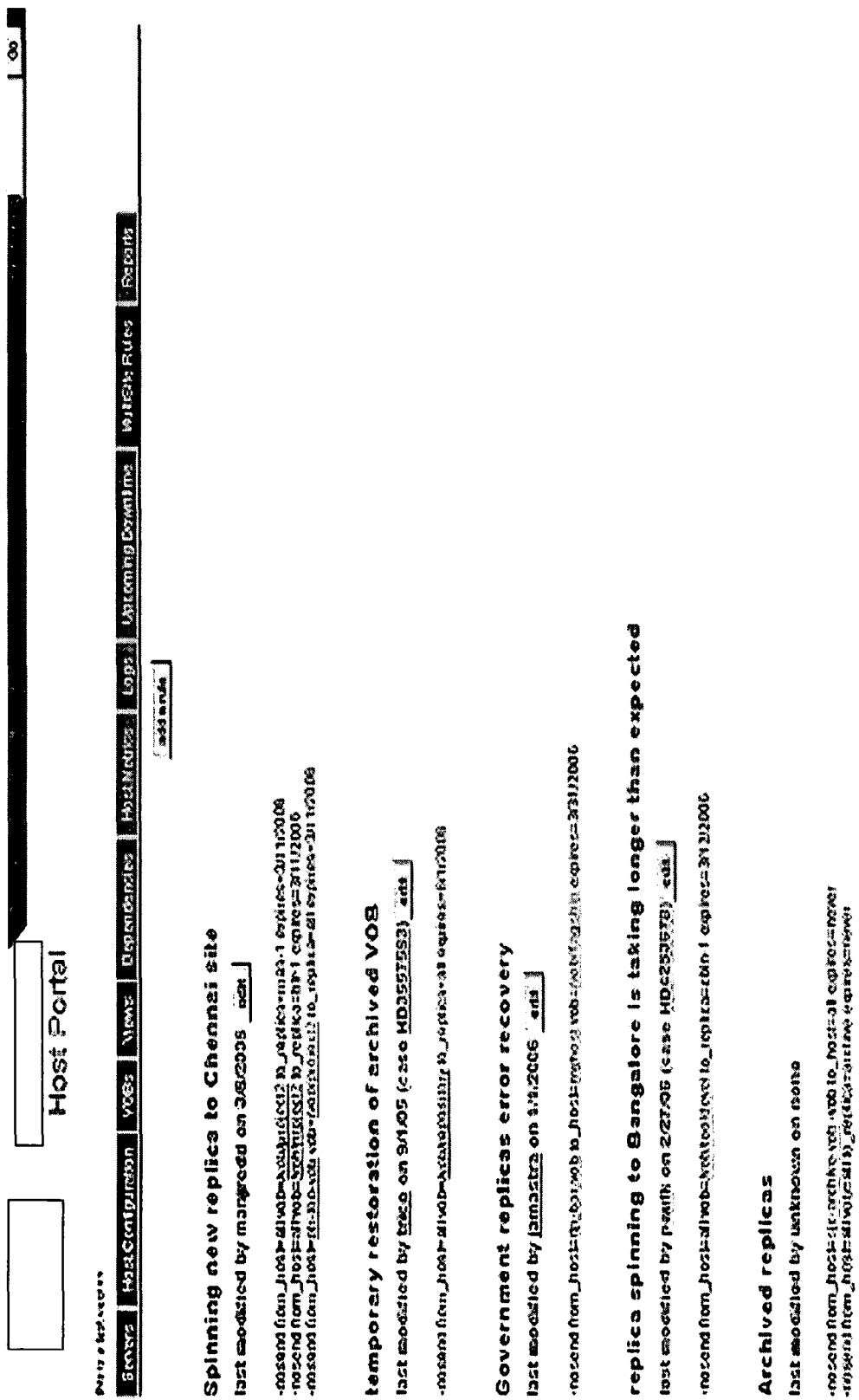
FIG. 18 illustrates yet another screenshot of a portal for providing information in a configuration management environment in accordance with an embodiment of the present invention.

FIG. 18 illustrates yet another screenshot of portal 302 for providing information in configuration management environment 100 in accordance with an embodiment of the present invention. The screenshot provides another exemplary illustration of portal 302. Portal 302 provides rules about the implementation of CM system 106 in the geographically wide area. The rules include rules regarding restoration of the repositories, replication of the repositories, server of the copies of the repositories, etc. Also in the description herein for embodiments of the present invention, a portion of the disclosure recited in the specification contains material, which is subject to copyright protection. Computer program source code, object code, instructions, text, interface design, design of web interface or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

Figure 20:
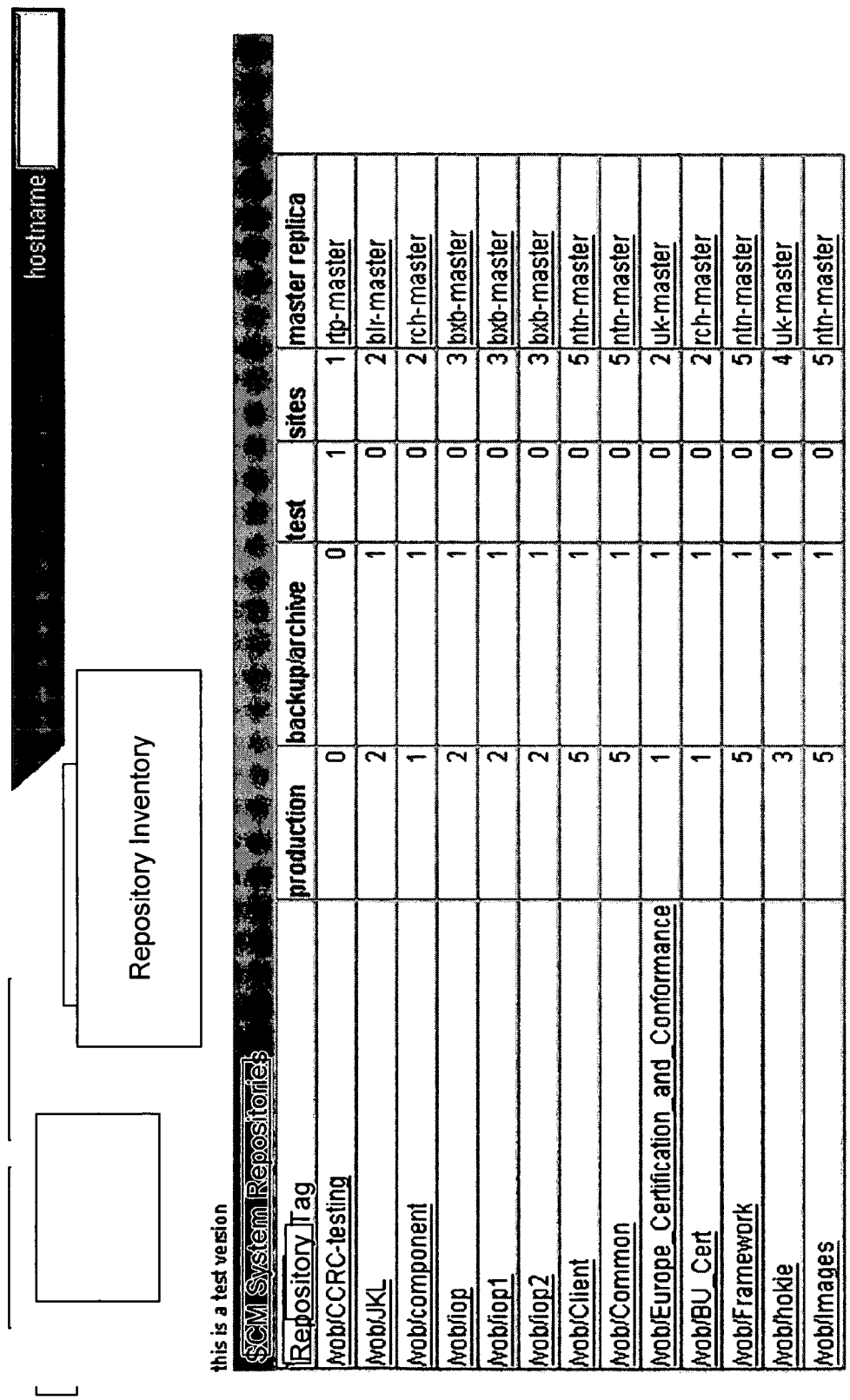
FIG. 20 illustrates yet another screenshot of a portal for providing information in a configuration management environment in accordance with an embodiment of the present invention.

FIG. 19 illustrates yet another screenshot of portal 302 for providing information in configuration management environment 100 in accordance with an embodiment of the present invention. The screenshot provides another exemplary illustration of portal 302. Portal 302 provides information regarding the virtual workspaces present in configuration management environment 100. Information regarding the virtual workspaces includes information regarding the owner of the virtual workspaces, storage size of the virtual workspaces, age of the virtual workspaces in number of days, and errors related to the virtual workspace. Also in the description herein for embodiments of the present invention, a portion of the disclosure recited in the specification contains material, which is subject to copyright protection. Computer program source code, object code, instructions, text, interface design, design of web interface or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

FIG. 20 illustrates yet another screenshot of portal 302 for providing information in configuration management environment 100 in accordance with an embodiment of the present invention. The screenshot provides another exemplary illustration of portal 302. Portal 302 provides information regarding the repositories present in configuration management environment 100. Information regarding the repositories includes information regarding the number of backup replicas 112 of the repositories, number of production replicas 114 of the repositories, location of the replicas of the repositories and testing of the replicas. Also in the description herein for embodiments of the present invention, a portion of the disclosure recited in the specification contains material, which is subject to copyright protection. Computer program source code, object code, instructions, text, interface design, design of web interface or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

An embodiment of the present invention provides a method for managing a configuration management environment. The configuration management environment comprises a Configuration Management (CM) system, a plurality of infrastructure devices, and a plurality of users, wherein the CM system is installed in each of the plurality of infrastructure devices. The method comprises collecting information related to development processes, wherein the development processes are executed in the configuration management environment; and providing the collected information through an access point to the plurality of users, wherein the collected information is used by one or more users selected from the plurality of users for managing the configuration management environment.

An embodiment of the present invention provides a machine-readable medium including instructions executable by one or more processors. The machine-readable medium comprises one or more instructions for collecting information related to development processes, wherein the development processes are executed in a configuration management environment; and one or more instructions for providing the collected information through an access point to a plurality of users, wherein the collected information is used by one or more users selected from the plurality of users for managing the configuration management environment.

An embodiment of the invention provides a portal that brings together information from various data sources which is critical to configuration management operations into a single interface. This is used by developers to: troubleshoot immediate issues by accessing alarms and trend data and filtering out unrelated information, correlate alarms based on other data provided by the portal, facilitate long term planning by viewing server inventories by a variety of criteria including geographic, server type, easily share data with interested parties (system administration, IT, CM system users), monitor CM infrastructure health, enable and disable synchronization of CM system across a geographically wide area, facilitate optimization by viewing resource, usage by usage patterns, host configuration (memory, CPU, host type etc.) geographic or network location, find failure patterns by correlating historic alarms as well as user submitted trouble tickets, one click access to sending email, notifications, and opening tickets with appropriate support organization.

According to an embodiment of the invention, the portal provides information from various data sources. The data sources include: CM system application metrics (license usage, host dependencies, filesystem dependencies), CM system repository metrics (disk usage, toolset configuration, access to alarms), CM system virtual workspace metrics (disk usage, workspace usage, access to alarms), CM system multisite metrics (synchronization attempt status, repository replica network topology), host performance metrics (filesystem, memory, process, and network performance trends), IT host configuration and contact information (i.e. EMAN support contacts) and scheduled outages (i.e. CM Downtime Notices), user submitted trouble tickets (Alliance), user information and their reporting structure (Corporate Directory).

According to an embodiment of the present invention, all of these data sources are brought into a single access mechanism and data is mined from CM system that isn't available otherwise. This idea makes that information more valuable by making the connections where appropriate.

An embodiment of the present invention provides a method and a system for managing a configuration management environment. The configuration management environment includes infrastructure devices and a configuration management (CM) system installed on the infrastructure devices. The CM system manages various development processes in the configuration management environment.

The present invention provides a unique application to deal with the complexity of managing CM system in a large distributed environment. A CM system installation with more than a single server in place could derive benefit from this invention.

An embodiment of the present invention provides a portal that provides information related to the infrastructure devices, the CM system, and the configuration management environment through an access point.

An embodiment of the present invention enables an administrator to obtain information from various sources through the portal, and refer the information for managing the configuration management environment.

An embodiment of the present invention provides information to various users through the portal. This implies that less support is required to collect the information. Further, the configuration management environment can be managed by employing a smaller number of support staff and administrators.

An embodiment of the present invention facilitates efficient management of the configuration management environment in a large organization, spread in a geographically wide area, which can be managed efficiently with a smaller support staff.

An embodiment of the present invention enables the administrator to immediately troubleshoot faults occurring in the configuration management environment by accessing alarms.

An embodiment of the present invention enables the administrators to make long-term plans for managing the configuration management environment and ensuring that the infrastructure devices are sound in all respects.

An embodiment of the present invention notifies the users about upcoming downtimes or system failures by sending e-mails and notifications to them.

An embodiment of the present invention enables the administrator to assign a ticket number to the problems submitted by the users, and provide a solution to their problems.

Although the invention has been discussed with respect to specific embodiments thereof, these embodiments are merely illustrative, and not restrictive, of the present invention. For example, a 'method for managing a configuration management environment' can include any type of analysis, manual or automatic, to anticipate the needs of obviating redundant actions.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

Any suitable programming language can be used to implement the routines of an embodiment of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments of the present invention, multiple steps shown as sequential in this specification can be performed at the same time. The sequence of operations described herein can be interrupted, suspended, or otherwise controlled by another process. The routines can operate in a networking environment or as stand-alone routines occupying all, or a substantial part, of the system processing.

In the description herein for the embodiments of the present invention, numerous specific details are provided, such as examples of elements and/or methods, to provide a thorough understanding of the embodiments of the present invention. One skilled in the relevant art will recognize, however, that an embodiment of the present invention can be practiced without one or more of the specific details, or with other apparatus, systems, assemblies, methods, components, parts, and/or the like. In other instances, well-known operations are not specifically shown or described in detail to avoid obscuring aspects of the embodiments of the present invention.

A 'computer program' for purposes of the embodiments of the present invention may include any processor-containing device, such as a mainframe computer, personal computer, laptop, notebook, microcomputer, server, personal data manager (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a pre-determined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of the embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of an embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the present invention to the precise forms disclosed herein. While specific embodiments of, and examples for, the present invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of the embodiments of the present invention will be employed without a corresponding use of other features without departing from the scope and spirit of the present invention as set forth. Therefore, many modifications may be made to adapt a particular situation or material to the essential scope and spirit of the present invention. It is intended that the present invention not be limited to the particular terms used in following claims and/or to the particular embodiment disclosed as the best mode contemplated for carrying out this present invention, but that the present invention will include any and all embodiments and equivalents falling within the scope of the appended claims.

What is claimed is:

1. A method comprising:
   configuring a server to interface with a configuration management (CM) environment distributed on a plurality of infrastructure devices;
   collecting, by the server, information related to development processes executed in a CM environment distributed on the plurality of infrastructure devices, the collected information comprising:
      information associated with a performance of a CM system installed in each of the plurality of infrastructure devices,
      information associated with the plurality of infrastructure devices, and
      information associated with dependencies between the plurality of infrastructure devices; and
   integrating the collected information into a single interface, the interface enabling at least one user to perform management functions based on the collected data, the management functions comprise:
      providing, based on the collected information associated with the performance of the CM system, fault information related to a particular infrastructure device, the fault information begin correlated with past fault information and system alarms and the fault information including a link to information related to the particular infrastructure device, and
      enabling, based on the collected information associated with dependencies between the plurality of infrastructure devices, the at least one user to send notifications to users affected by the fault associated with the particular infrastructure device by providing, within the linked information related to the particular infrastructure device, contact information for an administrator of the particular infrastructure device and administrators of infrastructure devices dependent on the particular infrastructure.

2. The method of claim 1, wherein the management functions further comprise providing the at least one user with options for obtaining the collected information across various locations in a geographically wide area.

3. The method of claim 1, wherein the collected information further comprises information related to usage patterns and the configuration of the plurality of infrastructure devices, and information related to the plurality of users using the plurality of infrastructure devices.

4. The method of claim 1, wherein the collected information further comprises information related to licenses of the CM system.

5. The method of claim 1, wherein the collected information further comprises information related to repositories and information related to faults occurring in the configuration management environment.

6. The method of claim 1, wherein the collected information further comprises information related to an application metrics, based on attributes of the CM system.

7. The method of claim 1, wherein the collected information further comprises information related to a repository metrics, based on attributes of a repository, a workspace metrics, based on attributes of a workspace, a host performance metrics, based on performance attributes of a host, and a user information-reporting structure.

8. The method of claim 1, wherein collected information further comprises information regarding application of the CM system across a plurality of locations.

9. The method of claim 1, wherein the management functions further comprise providing information related to downtime of the CM system.

10. A non-transitory machine-readable medium including instructions executable by one or more processors, the machine-readable medium comprising:
    one or more instructions for configuring a server to interface with a configuration management (CM) environment distributed on a plurality of infrastructure devices;
    one or more instructions for collecting, by the server, information related to development processes executed in a CM environment distributed on the plurality of infrastructure devices, the collected information comprising:
       information associated with a performance of a CM system installed in each of the plurality of infrastructure devices,
       information associated with the plurality of infrastructure devices, and
       information associated with dependencies between the plurality of infrastructure devices; and
    one or more instructions for integrating the collected information into a single interface, the interface enabling at least one user to perform management functions based on the collected data, the management functions comprise:
       providing, based on the collected information associated with the performance of the CM system, fault information related to a particular infrastructure device, the fault information begin correlated with past fault information and system alarms and the fault information including a link to information related to the particular infrastructure device, and
       enabling, based on the collected information associated with dependencies between the plurality of infrastructure devices, the at least one user to send notifications to users affected by the fault associated with the particular infrastructure device by providing, within the linked information related to the particular infrastructure device, contact information for an administrator of the particular infrastructure device and administrators of infrastructure devices dependent on the particular infrastructure.

11. The non-transitory machine-readable medium of claim 10 further comprising one or more instructions for installing the CM system in a plurality of infrastructure devices in the configuration management environment.

12. The non-transitory machine-readable medium of claim 11, wherein the CM system comprises one or more instructions for tracking metadata of one or more files related to the development processes.

13. The non-transitory machine-readable medium of claim 12, wherein the CM system further comprises one or more instructions for selecting the one or more files related to the development processes.

14. The non-transitory machine-readable medium of claim 12, wherein the CM system further comprises one or more instructions for storing the tracked metadata of the one or more files in a central database.

15. The non-transitory machine-readable medium of claim 12, wherein the CM system further comprises one or more instructions for updating the tracked metadata of the one or more files in the central database.

16. The non-transitory machine-readable medium of claim 14, wherein the CM system further comprises one or more instructions for maintaining one or more backup replicas of the central database.

17. The non-transitory machine-readable medium of claim 14, wherein the CM system further comprises one or more instructions for maintaining a master replica of the central database.

18. The non-transitory machine-readable medium of claim 14, wherein the CM system further comprises one or more instructions for maintaining a plurality of production replicas of the central database.

* * * * *

UNITED STATES PATENT AND TRADEMARK OFFICE
CERTIFICATE OF CORRECTION

| | | |
|---|---|---|
| PATENT NO. | : 8,732,294 B1 | |
| APPLICATION NO. | : 11/439363 | |
| DATED | : May 20, 2014 | |
| INVENTOR(S) | : Rice et al. | |

It is certified that error appears in the above-identified patent and that said Letters Patent is hereby corrected as shown below:

In the Specification

In column 7, line 18, please replace:
"browzer" with "browser"

Signed and Sealed this
Twentieth Day of October, 2015

Michelle K. Lee
*Director of the United States Patent and Trademark Office*